US009783430B2

(12) United States Patent
Rice

(10) Patent No.: US 9,783,430 B2
(45) Date of Patent: Oct. 10, 2017

(54) SELF-CONTAINED WATER FILTRATION SYSTEM INCLUDING WIRELESS COMMUNICATION AND FILTER VERIFICATION AND METHOD OF USING THE SAME

(71) Applicant: Zachary Rice, Las Vegas, NV (US)

(72) Inventor: Zachary Rice, Las Vegas, NV (US)

(73) Assignee: Multipure International, Las Vegas, NV (US)

(*) Notice: Subject to any disclaimer, the term of this patent is extended or adjusted under 35 U.S.C. 154(b) by 0 days.

(21) Appl. No.: 14/458,218

(22) Filed: Aug. 12, 2014

(65) Prior Publication Data

US 2016/0046502 A1    Feb. 18, 2016

(51) Int. Cl.
*C02F 1/00* (2006.01)
*G06K 7/00* (2006.01)
*B01D 35/31* (2006.01)

(52) U.S. Cl.
CPC .............. *C02F 1/008* (2013.01); *C02F 1/003* (2013.01); *B01D 35/31* (2013.01);
(Continued)

(58) Field of Classification Search
CPC ...... B01D 27/08; B01D 27/101; B01D 35/31; B01D 35/143; B01D 35/1435; B01D 35/30; B01D 2201/56; B01D 2201/307; B01D 2201/52; C02F 1/003; C02F 2201/006; C02F 2209/44; C02F 2209/445;
(Continued)

(56) References Cited

U.S. PATENT DOCUMENTS 4,609,463 A    9/1986  Macevicz et al.
5,128,034 A    7/1992  Kool
(Continued)

FOREIGN PATENT DOCUMENTS

CN    102348645 A    2/2012

OTHER PUBLICATIONS

Protecting Against Counterfeits, Generics and Substitutes with RFID, SkyeTek, Inc., Mar. 21, 2007.
(Continued)

*Primary Examiner* — Terry Cecil
(74) *Attorney, Agent, or Firm* — Greenberg Traurig, LLP; Todd C. Basile

(57) ABSTRACT

A water filtration housing containing a pressure vessel configured to receive a water filter cartridge; a ring enclosure attachable to an open, top end of the housing enclosure; an interface tower including a user interface; a lid assembly removably attachable to the ring enclosure, the lid assembly including (i) a pressure cap and gasket for maintaining a given pressure in said pressure vessel and (ii) a rotatable lever for disengaging the pressure cap from the pressure vessel thereby releasing pressure therein. A mating system between the lid assembly and ring enclosure prevents the lid assembly from being attached to the ring enclosure in a misaligned fashion. RFID technology may be used for identifying the water filter cartridge installed therein and wireless communication technology (e.g., Wi-Fi) to transmit collected system data (e.g., water usage) to a central location for analysis such that the customer is provided with, for example, operational suggestions.

21 Claims, 16 Drawing Sheets

(52) U.S. Cl.
CPC ...... *B01D 2201/52* (2013.01); *B01D 2201/56* (2013.01); *C02F 2201/006* (2013.01); *C02F 2209/008* (2013.01); *C02F 2209/445* (2013.01); *C02F 2307/10* (2013.01)

(58) Field of Classification Search
CPC ............ C02F 2209/008; C02F 2307/04; C02F 2307/10; G06K 7/0008
See application file for complete search history.

(56) References Cited

U.S. PATENT DOCUMENTS

| | | | |
|---|---|---|---|
| 5,916,439 | A | 6/1999 | Oleskow |
| 6,024,867 | A | 2/2000 | Parise |
| 6,585,885 | B2 | 7/2003 | Larkner et al. |
| 6,613,236 | B1 | 9/2003 | Guess et al. |
| 6,954,701 | B2 | 10/2005 | Wolfe |
| 7,186,338 | B2 | 3/2007 | Boisvert |
| 7,481,917 | B2 | 1/2009 | Ikeyama et al. |
| 7,638,042 | B2 | 12/2009 | Astle et al. |
| 7,699,993 | B2 | 4/2010 | Larkner |
| 7,736,495 | B2 | 6/2010 | Ikeyama et al. |
| 7,761,188 | B2 | 7/2010 | Palmerton et al. |
| 7,824,543 | B2 | 11/2010 | Larkner |
| 8,702,977 | B2 | 4/2014 | Shah et al. |
| 2006/0065607 | A1 | 3/2006 | Bassett et al. |
| 2006/0137090 | A1 | 6/2006 | Jeffries et al. |
| 2009/0090661 | A1* | 4/2009 | Tanner et al. ................... 210/87 |
| 2010/0106265 | A1 | 4/2010 | Ebrom et al. |
| 2010/0237013 | A1 | 9/2010 | Burke et al. |
| 2011/0062060 | A1* | 3/2011 | Royal et al. .................... 210/85 |
| 2012/0000858 | A1* | 1/2012 | Butler et al. ................... 210/741 |
| 2012/0132573 | A1 | 5/2012 | Lautzenheiser et al. |
| 2013/0068673 | A1* | 3/2013 | Maggiore et al. .............. 210/95 |
| 2013/0220900 | A1* | 8/2013 | Milvert et al. .................. 210/85 |
| 2014/0180761 | A1* | 6/2014 | Yolles et al. ................ 705/7.29 |

OTHER PUBLICATIONS

PCT Notification of Transmittal of the International Search Report and Written Opinion of the International Searching Authority for International Application No. PCT/US2015/044212 (20 pages).
Office Action in U.S. Appl. No. 14/455,644 dated Mar. 7, 2017.

* cited by examiner

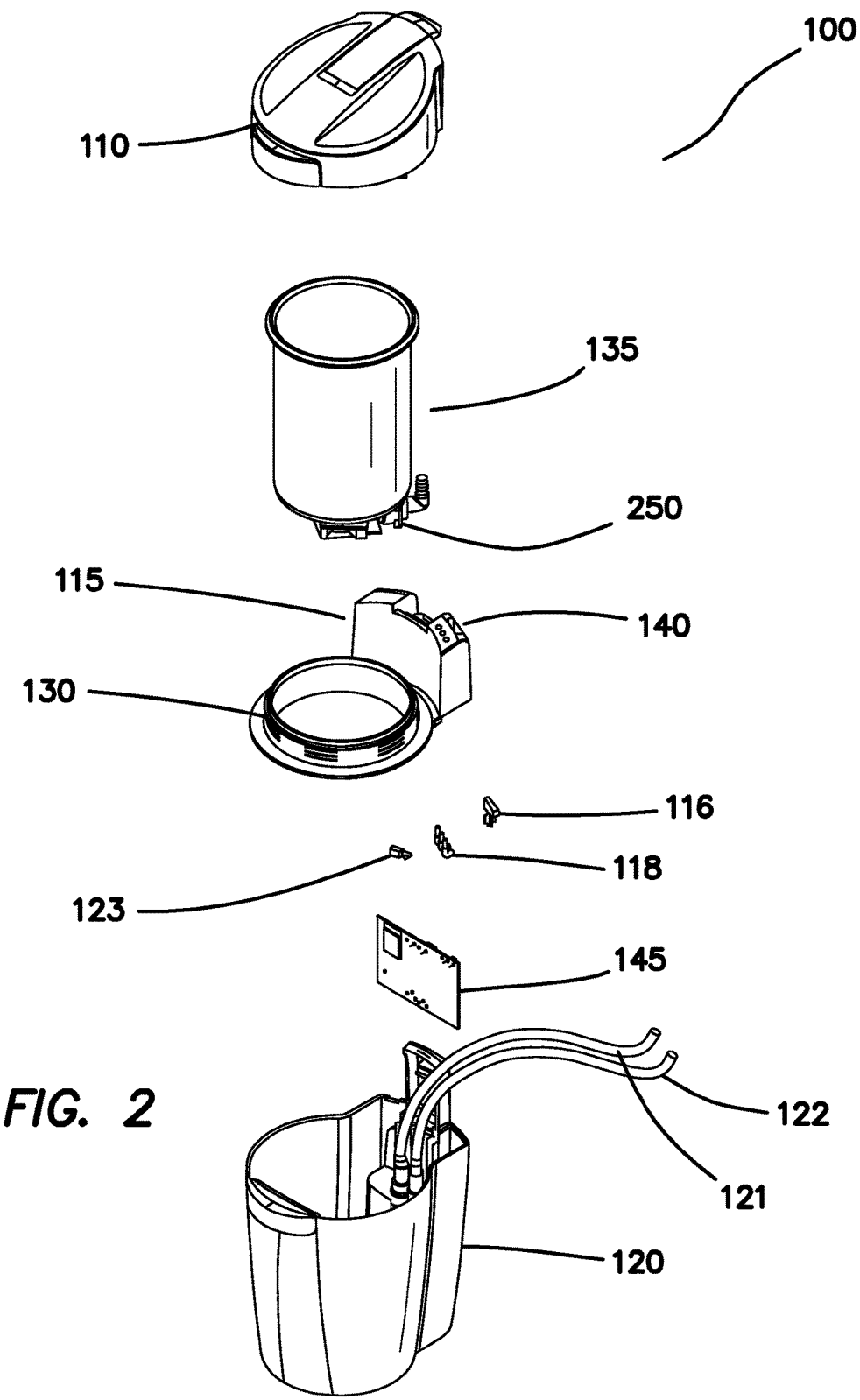

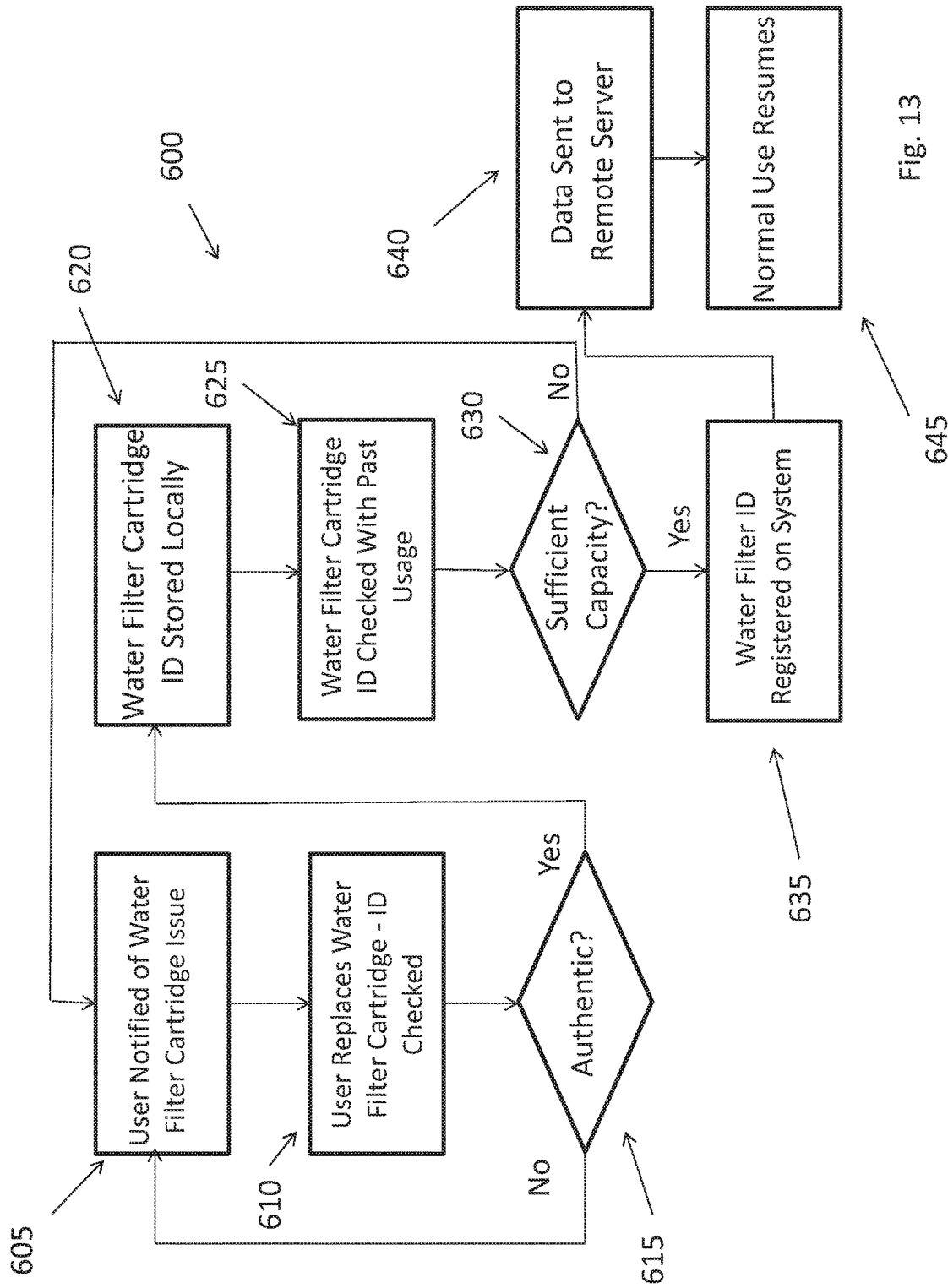

SELF-CONTAINED WATER FILTRATION SYSTEM INCLUDING WIRELESS COMMUNICATION AND FILTER VERIFICATION AND METHOD OF USING THE SAME

FIELD OF THE INVENTION

The embodiments of the present invention relate to a countertop-style water filtration system configured to allow a user to change batteries and a water filter cartridge easily while providing filter tracking and Wi-Fi capabilities.

BACKGROUND

Water purification is the process of removing undesirable chemicals, biological contaminants, suspended solids and gases from contaminated water. Water purification is a multi-billion dollar industry. Water purification systems for home drinking water come in all shapes and sizes including large, expensive systems, simple, container-implemented systems, faucet-connected systems and everything in between. Countertop purifiers and filtration systems are a popular solution offering users convenience at a generally low cost.

It would be advantageous to develop a countertop water filtration system integrating user-friendly features as well as advanced technologies for communicating usage data to a central location, tracking usage of the water filter and optionally disabling or shutting off the water filtration system responsive to the installation of a non-branded or spent water filter.

SUMMARY

Accordingly, one embodiment of the present invention comprises a housing containing a pressure vessel configured to receive a water filter cartridge; a ring enclosure attachable to an open, top end of the housing enclosure; an interface tower including a user interface; a lid assembly removably attachable to said ring enclosure, said lid assembly including (i) a pressure cap and gasket for maintaining a given pressure in said pressure vessel and (ii) a rotatable lever for disengaging said pressure cap from said pressure vessel thereby releasing said pressure in said pressure vessel. In one embodiment, a locking system between the lid assembly and ring enclosure prevents the lid assembly from being attached to the ring enclosure in a misaligned fashion. The locking system also provides an efficient mechanism whereby a user need only turn the lid assembly slightly to disengage it from the ring enclosure.

In another embodiment, the water filtration system incorporates RFID technology for identifying the water filter installed therein. Based on the identification, the system may shut down, sound an alarm or otherwise prevent the use of a non-branded or spent water filter whether branded or not.

In another embodiment, the water filtration system incorporates wireless communication technology (e.g., Wi-Fi) to transmit collected system data (e.g., water usage) to a central location for analysis such that the customer may be provided with, for example, operational suggestions.

Other variations, embodiments and features of the present invention will become evident from the following detailed description, drawings and claims.

BRIEF DESCRIPTION OF THE DRAWINGS

FIG. 2 illustrates an exploded view of the water filtration system according to the embodiments of the present invention;

FIG. 13 illustrates a second flow chart detailing an authentication process associated with the water filter cartridge according to the embodiments of the present invention.

DETAILED DESCRIPTION

Figure 1A:
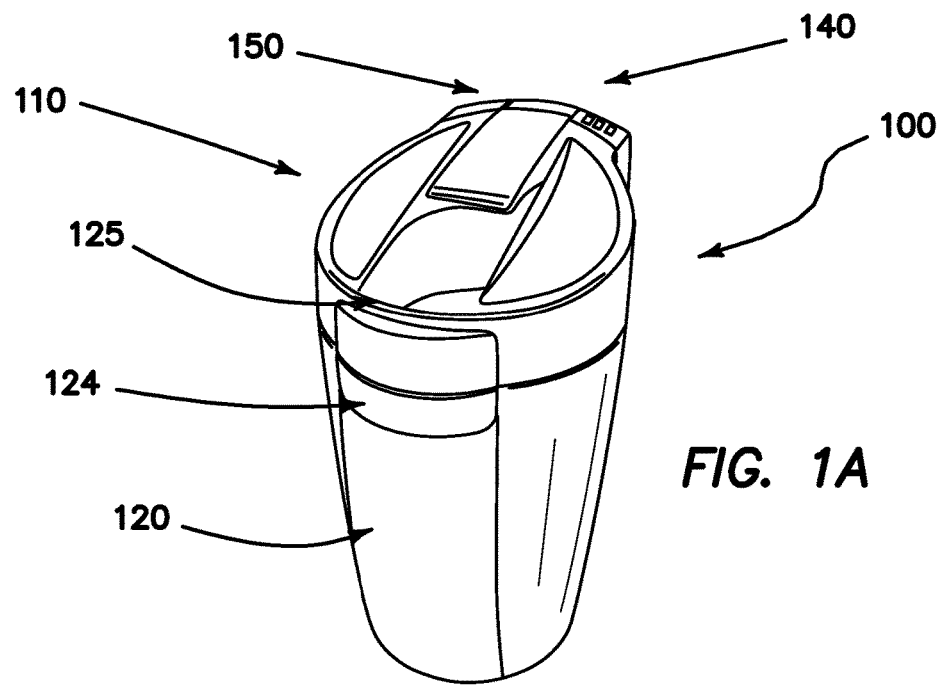
FIGS. 1A-1C illustrate perspective and top views of a water filtration system according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to those skilled in the relevant art and having possession of this disclosure, are to be considered within the scope of the invention claimed.

The components of the embodiments of the present invention may be fabricated of any suitable materials, including woods, plastics, alloys, composites, resins and metals, and may be fabricated using suitable techniques, including molding, casting, machining and rapid prototyping.

Figure 1B:
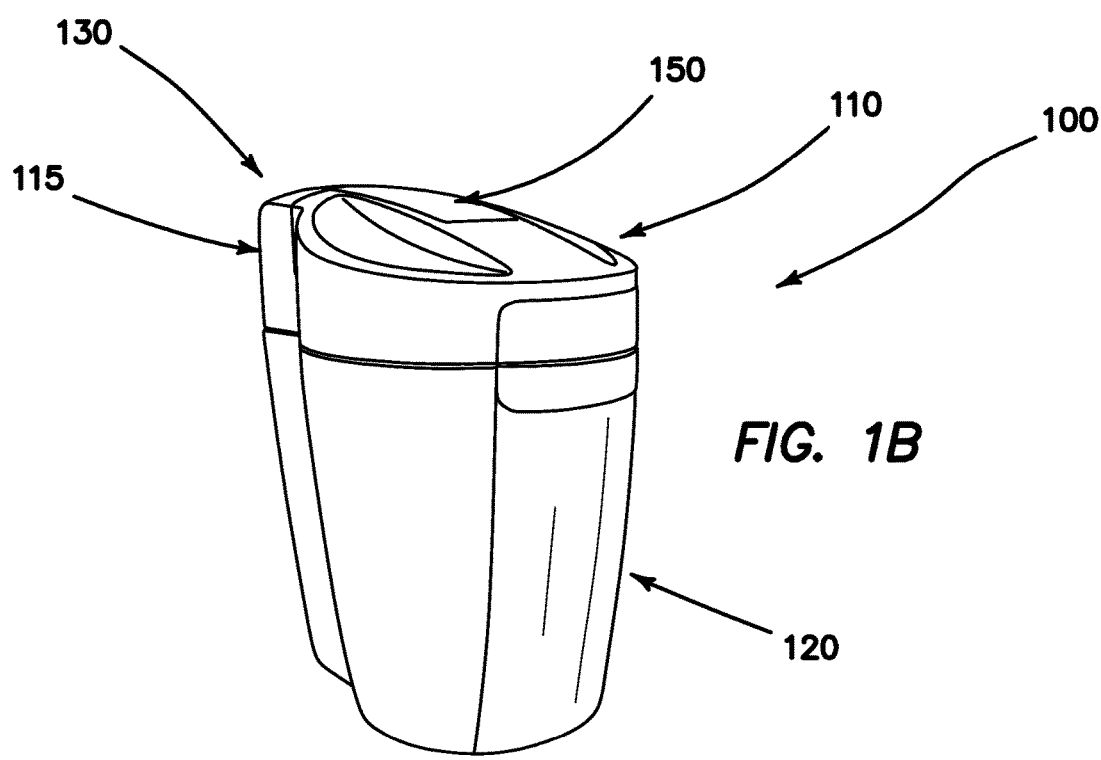
Figure 1C:
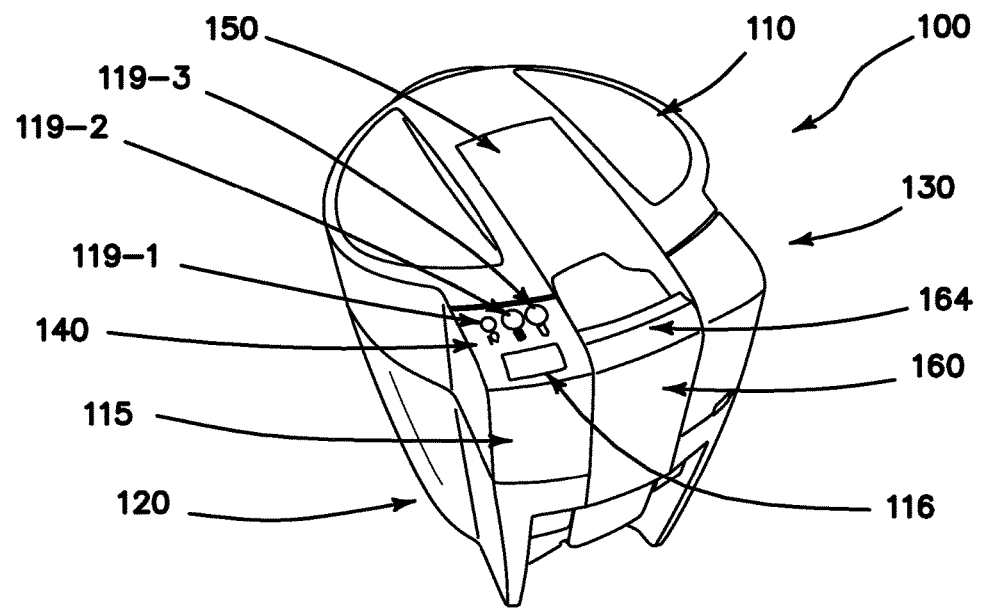

FIGS. 1A through 1C show perspective and top views of a water filtration system 100 according to the embodiments of the present invention. As shown, the water filtration system 100 includes a lid assembly 110, housing assembly 120, ring enclosure 130, user interface 140, rotatable lid lever 150 and rotatable rear lever 160 which are each described in more detail below.

FIG. 2 shows an exploded view of the water filtration system 100 including a lid assembly 110, housing assembly 120, ring enclosure 130, pressure vessel 135 and printed circuit board 145. The housing assembly 120 and ring enclosure 130 can be a single, integral unit such that the lid assembly 110 attaches directly to the housing assembly 120. The printed circuit board 145 is positioned within an interface tower 115 integral with said ring enclosure 130 including control button 116 which may be used to (i) turn the water filtration system 100 on and off; (ii) check filter life; (iii) check gallons of water filtered, etc. The interface tower 115 may also incorporate a light pipe 118 for providing operational information regarding the water filtration system 100 and status/state thereof indicator lights 119-1 through 119-3. A USB plug 123 is integrated into said interface tower 115 providing means to manually download data from or to the water filtration system 100 as needed. A source water line (inlet) 121 and purified water line (outlet) 122 connect to the housing assembly 120 and serve to receive source water in need of purification and dispense purified water as detailed below.

Figure 3:
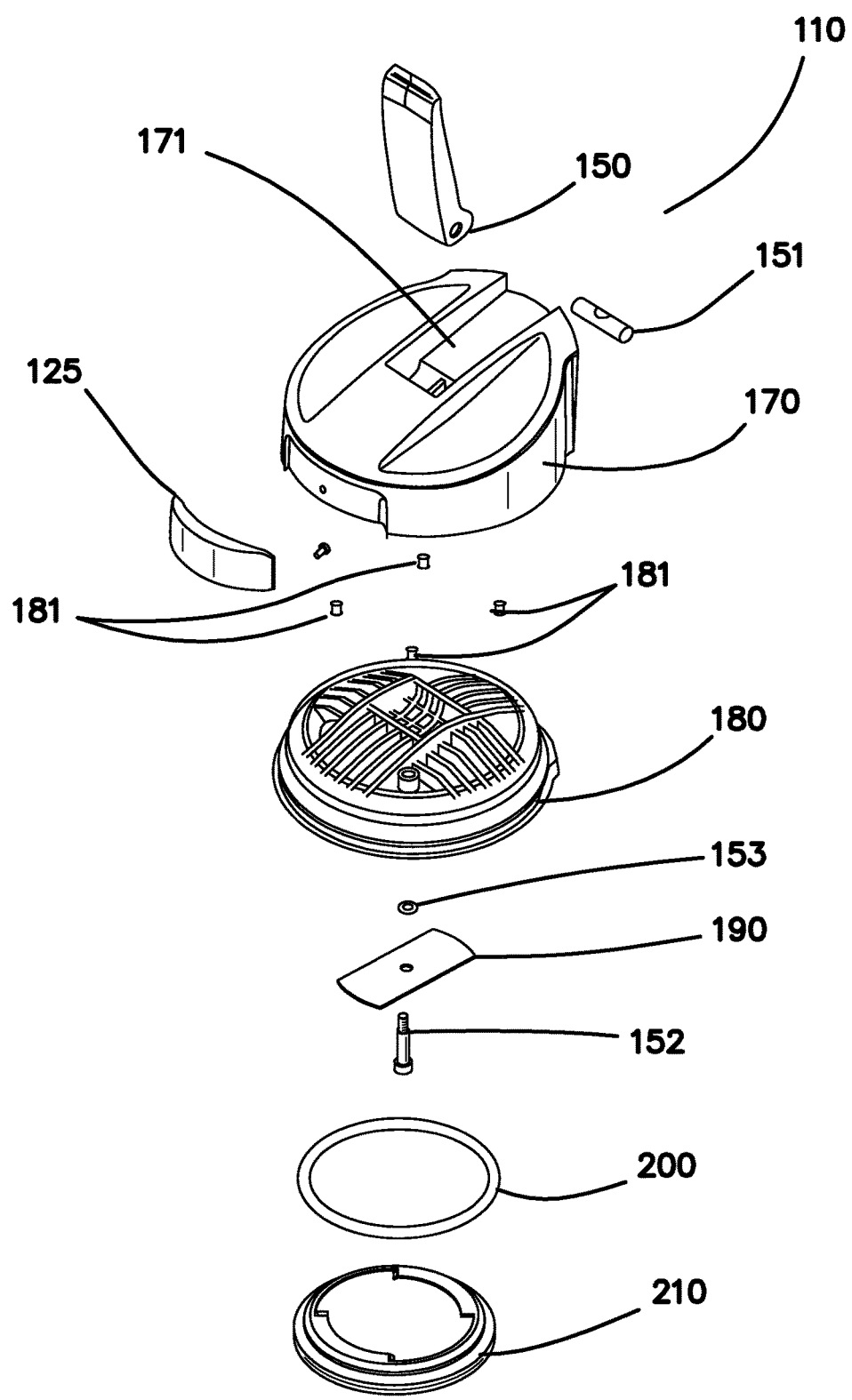
FIG. 3 illustrates an exploded view of a lid assembly according to the embodiments of the present invention.

FIG. 3 illustrates an exploded view of the lid assembly 110 according to the embodiments of the present invention. While the lid assembly 110 herein is described with reference to the water filtration system 100, it is understood by the applicant hereof that the lid assembly 110 may have other uses and applications beyond the water filtration system 100. The lid assembly 110 includes rotatable lid lever 150, upper enclosure 170, compression cap 180, spring leaf 190, gasket 200 and pressure cap 210. The rotatable lid lever 150 attaches to the upper enclosure 170 via barrel nut 151. As detailed below, the rotatable lid lever 150 acts to engage and disengage the pressure cap 210 from the pressure vessel 135 thereby maintaining and releasing pressure in the pressure vessel 135. Pressure cap 210 attaches to an underside of the compression cap 180. In one embodiment, four press-fit expansion nuts 181 are used to attach the pressure cap 210 to the compression cap 180 which is then attached to the upper enclosure 170. The spring leaf 190 is retained by the pressure cap 210 via a pair of overhangs 211 and connected to barrel nut 151 with a bolt 152 extending through a center opening 191 in leaf spring 190, washer 153 and a center opening in compression cap 180 into said barrel nut 151. As best shown in FIGS. 2 and 3, in this manner, when the rotatable lid lever 150 is rotated upward, leaf spring 190 forces pressure cap 210 and gasket 200 to lift up thereby disengaging from pressure vessel 135 and when the rotatable lid lever 150 is rotated downward, leaf spring 190 forces pressure cap 210 and gasket 200 downward thereby engaging pressure vessel 135.

Figure 4C:
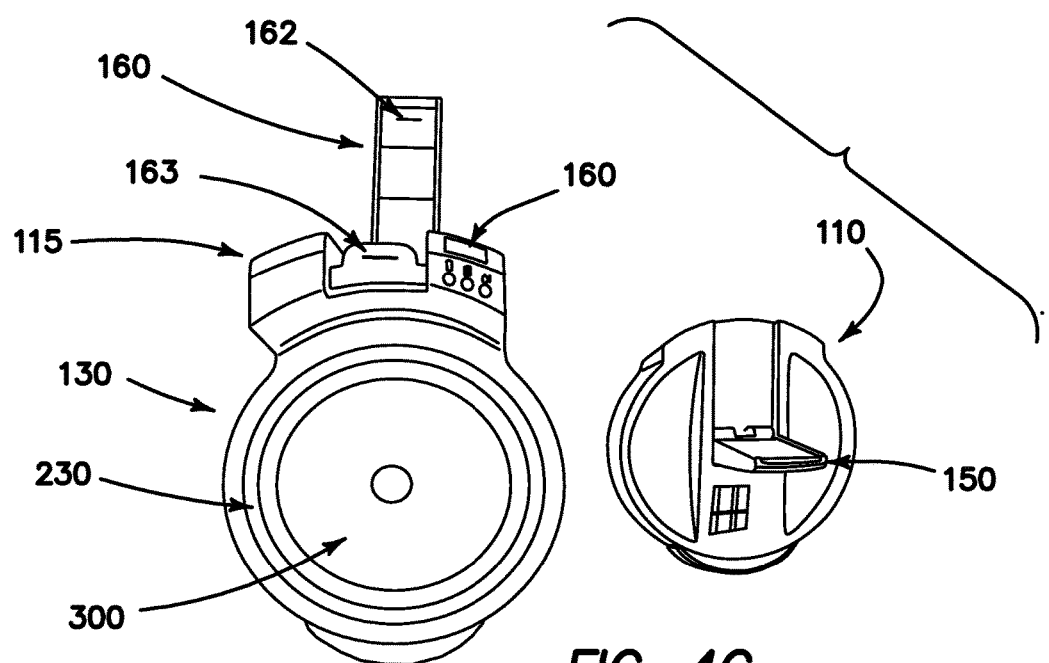
FIGS. 4A-4C illustrate underside views of a lid assembly in closed and open states and a top view of the lid assembly removed according to the embodiments of the present invention.
Figure 4A:
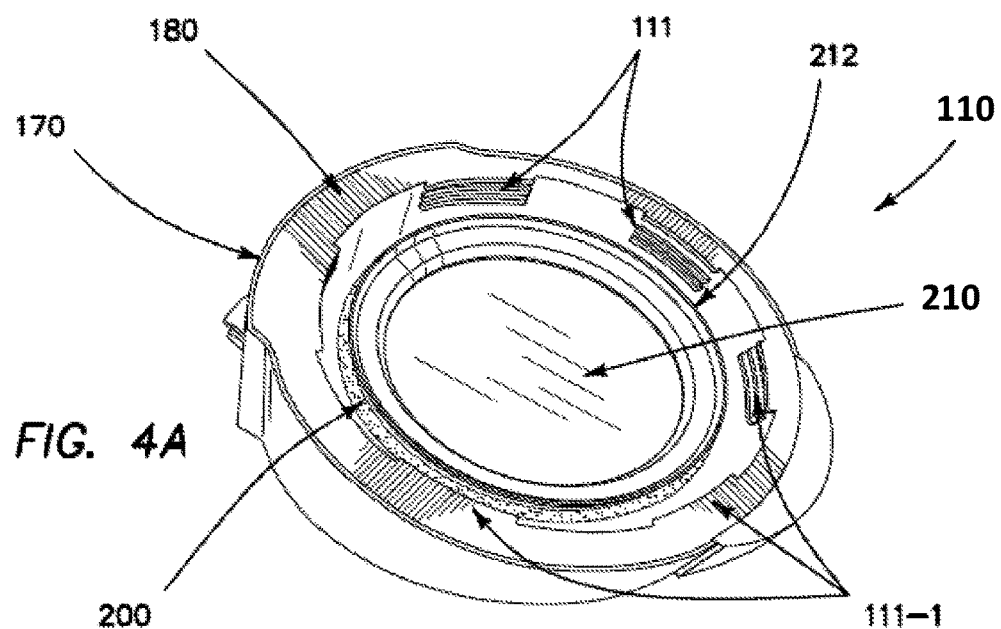
Figure 4B:
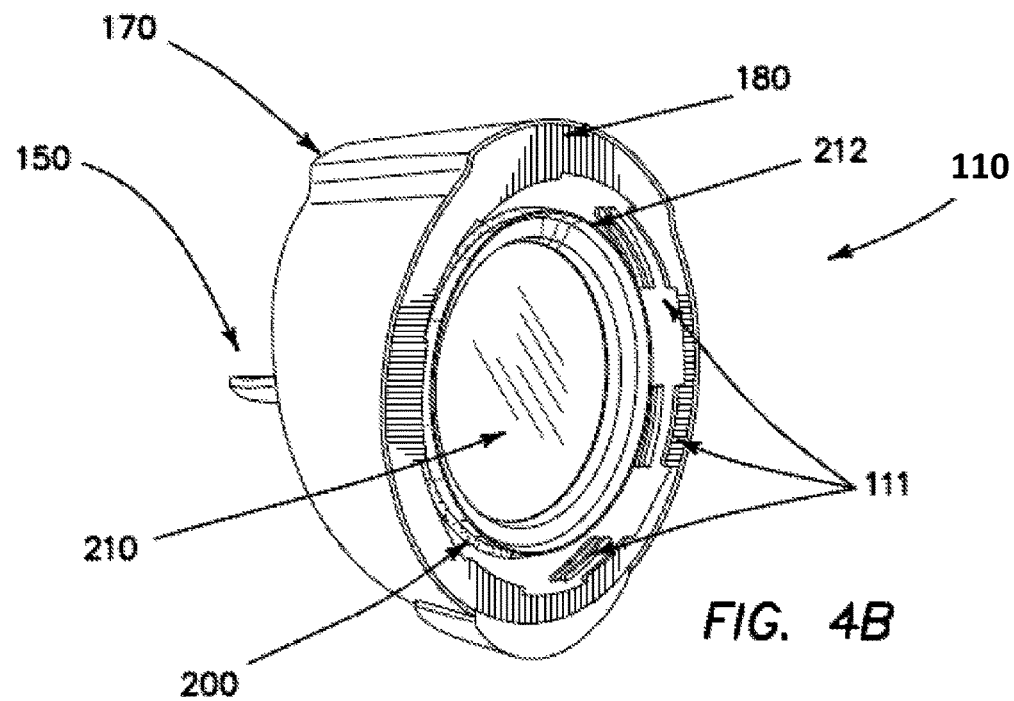

FIGS. 4A and 4B illustrate underside views of the lid assembly 110 in closed and open states, respectively. In a closed state, the rotatable lid lever 150 is in a down position recessed within a cavity 171 in the upper enclosure 170. When the rotatable lid lever 150 is in a down position, an outer wall 212 of the pressure cap 210 and gasket 200 are inserted into the pressure vessel 135 with gasket 200 circumscribing an upper inner surface of the pressure vessel 135 creating a seal, and vacuum within the pressure vessel 135. The seal and vacuum are created as the pressure cap 210 presses the gasket 210 against an inner upper surface of the pressure vessel 135. Water pressure inside of the pressure vessel 135 creates an upward pressure against the pressure cap 210 thereby assisting with the formation of the seal and vacuum by forcing the pressure cap 210 further upward into the gasket 200 which is then pushed further against the inner surface of the pressure vessel 135. In this manner, contrary to most systems, the greater the pressure within the pressure vessel 135, the greater the strength of the seal. When the rotatable lid lever 150 is in an open position, the pressure cap 210 lowers releasing pressure against gasket 200 and therefore against the inner upper surface of the pressure vessel 135 breaking the seal and extinguishing the vacuum within the pressure vessel 135. With the rotatable lid lever 150 in an upper position and the seal disrupted, the lid assembly 110 is free to turn relative to the ring enclosure 130 or housing 120 for removal as needed. FIG. 4C shows an upper view of the water filtration system 100 with the lid assembly 110 removed. A water filter cartridge 300 is viewable within the pressure vessel 135.

Figure 5:
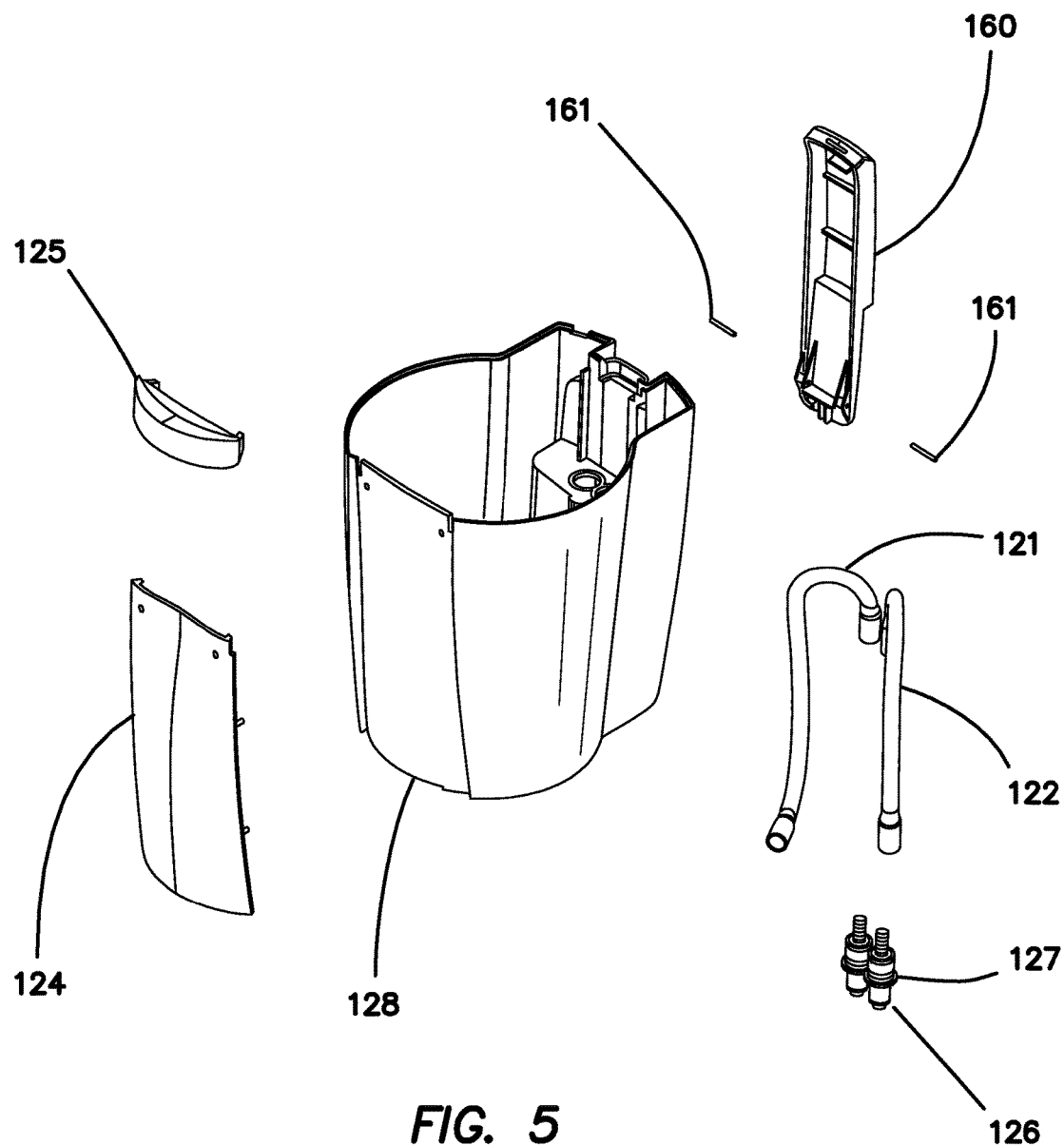
FIG. 5 illustrates an exploded view of a housing assembly according to the embodiments of the present invention.

FIG. 5 shows an exploded view of housing assembly 120 comprising housing enclosure 128, source water line (inlet) 121, purified water line (outlet) 122, front panel 124, badge 125, inlet water line connector 126, outlet water line connector 127 and rotatable rear lever 160. Rotatable rear lever 160 attaches to said housing enclosure 128 via a pair of pins 161. Rotatable rear lever 160 serves to, when opened, provide access to rotatable lid lever 150. As shown in FIG. 1C, when closed, an upper portion 164 of rotatable rear lever 160 covers one end of the rotatable lid assembly 150 prohibiting the rotatable lid lever 150 from being released and the lid assembly 110 from being removed. Accordingly, as shown in FIGS. 10A-10E, disassembling the water filtration system 100 comprises: (i) releasing rotatable rear lever 160 (reveals battery compartment 165); (ii) releasing rotatable lid lever 150; (iii) turning said lid assembly 110 in counter-clockwise fashion unlocking lid assembly teeth 111 (FIGS. 4A, 4B and 7C) from ring enclosure teeth 131 (FIGS. 10B and 10E); and (iv) removing said lid assembly 110 accessing the water filter cartridge 300. More particularly, the lid assembly teeth 111 are on an inner surface of the compression cap 180. Rotatable rear lever 160 conceals a battery compartment 165 containing batteries for powering various features of the water filtration system 100. The rotatable rear lever 160 is held in place via a latch 162 on an inner surface of said rotatable rear level 160 and mount 163 on said ring enclosure 130, namely the interface tower 115 thereof.

The position of the lid assembly teeth 111 and ring enclosure teeth 131 provide a secure connection while requiring a user to only turn the lid assembly 110 slightly for removal or attachment. For example, depending on the spacing of the lid assembly teeth 111 and ring enclosure teeth 131, a user may need to only turn the lid assembly thirty degrees or less to allow for removal or attachment. This is unlike, and much more efficient than, a fully threaded arrangement which requires many complete turns (i.e., more than 360 degrees).

As configured, the lid assembly teeth 111 and ring enclosure teeth 131 are positioned to guarantee alignment of the lid assembly 110 with the ring enclosure 130. Placing said lid assembly 110 on said ring enclosure 130 comprises: (i) with said rotatable lid lever 150 in open state, positioning said lid assembly 110 with the rotatable lid lever 150 proximate said interface member 115; (ii) lowering said lid assembly 110 with the lid assembly teeth 111 between said ring enclosure teeth 131 (the positions of the lid assembly teeth 111 and ring enclosure teeth 131 limit to one the proper orientation of the lid assembly 110 on the ring enclosure 130; (iii) turning said lid assembly 110 aligning said rotatable lid lever 150 with said rotatable rear lever 160 as lid assembly teeth 111 mate with ring enclosure teeth 131 locking said lid assembly 110 in place; (iv) closing said rotatable lid lever 150 to create a vacuum seal within said pressure vessel 135 and (v) closing said rotatable rear lever 160 thereby locking said rotatable lid lever 160. The position of the lid assembly teeth 111 and ring enclosure teeth 131 provide a secure connection while requiring a user to only slightly turn the lid assembly 110 for attachment. As shown in FIG. 4A, lowermost teeth 111-1 of each grouping of teeth 111 of said lid assembly 110 are flush with a lower edge of the compression cap 180 so that said lid assembly 110 cannot be lowered onto said ring enclosure 130 at all until said lid assembly teeth 111 are aligned with spaces in the ring enclosure teeth 131. In one embodiment, the pattern of the teeth 111, 131 allows the lid assembly 110 to lower onto the ring enclosure 130 in a single orientation only.

Figure 6:
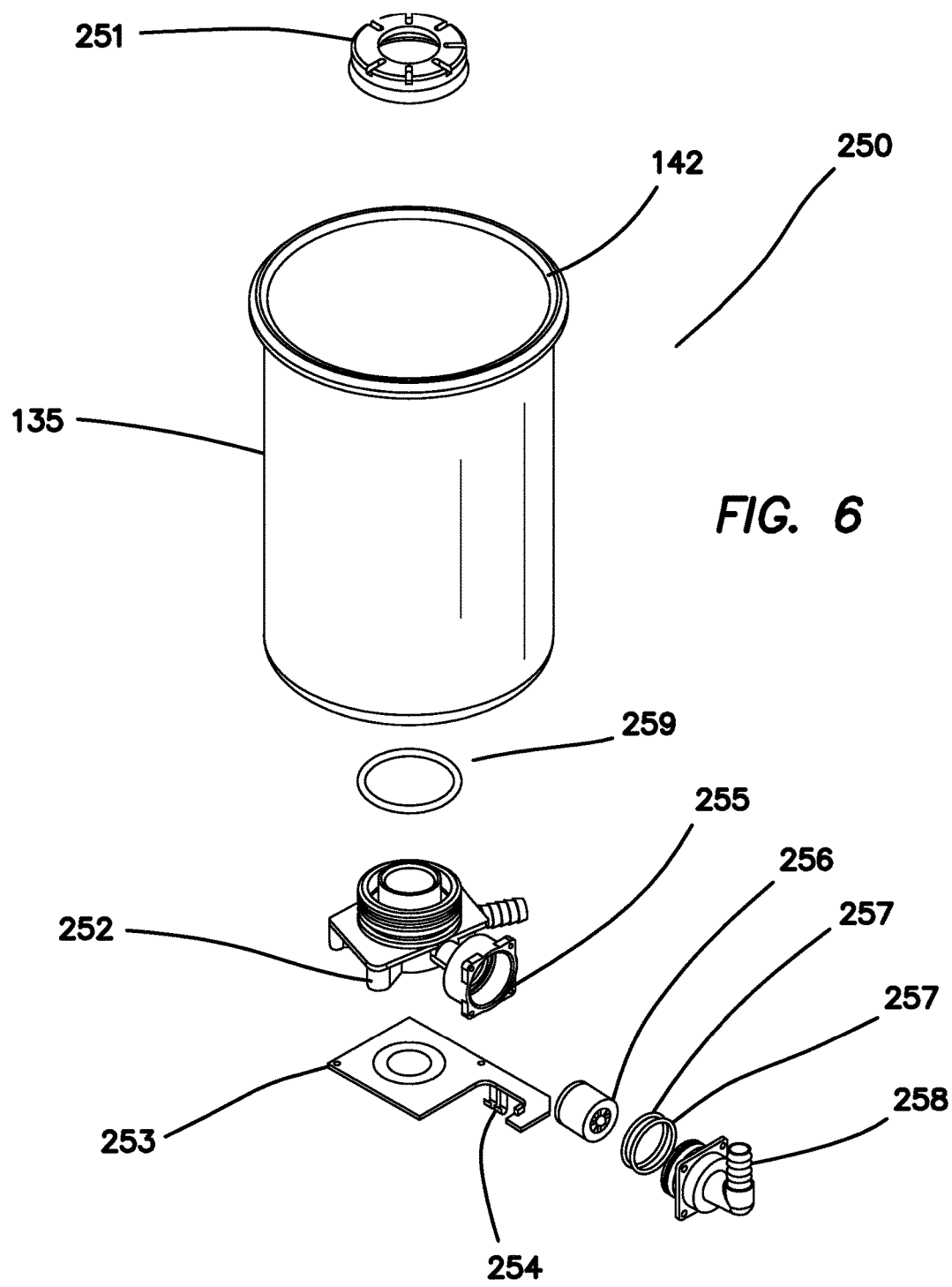
FIG. 6 illustrates an exploded view of a pressure vessel sub-assembly according to the embodiments of the present invention.

FIG. 6 illustrates an exploded view of the pressure vessel sub-assembly 250 according to the embodiments of the present invention. The pressure vessel sub-assembly comprises broadly the pressure vessel 135, exit fitting 251, base member 252, leak detector 253, leak detector antenna 254, impeller module housing 255, impeller module 256, O-rings 257, elbow fitting 258 and exit gasket 259. The impeller module 255 is configured to move purified water into purified water line (outlet) 122. The electronic leak detector 253 is configured to detect water leaks beneath the pressure vessel 135 and generate a leak signal transmitted via leak detector antenna 254 to a receiver which triggers a leak light or other mechanism for alerting the user. In one embodiment, the pressure vessel 135 is fabricated of stainless steel.

Figure 7A:
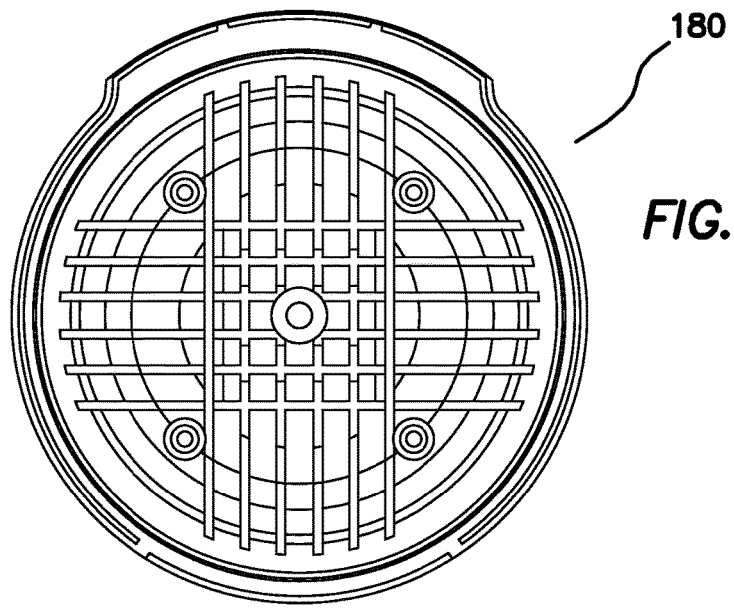
FIGS. 7A-7C illustrate several views of the compression cap according to the embodiments of the present invention.
Figure 7B:
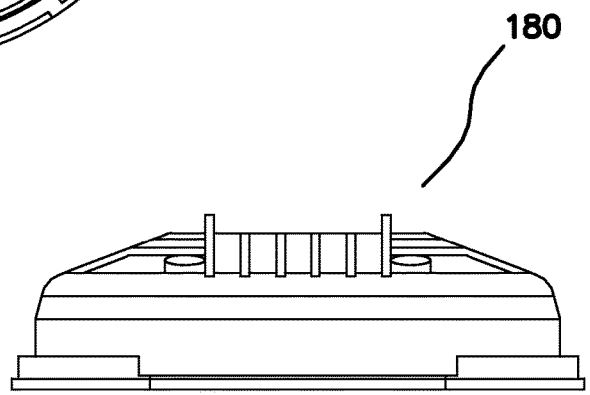
Figure 7C:
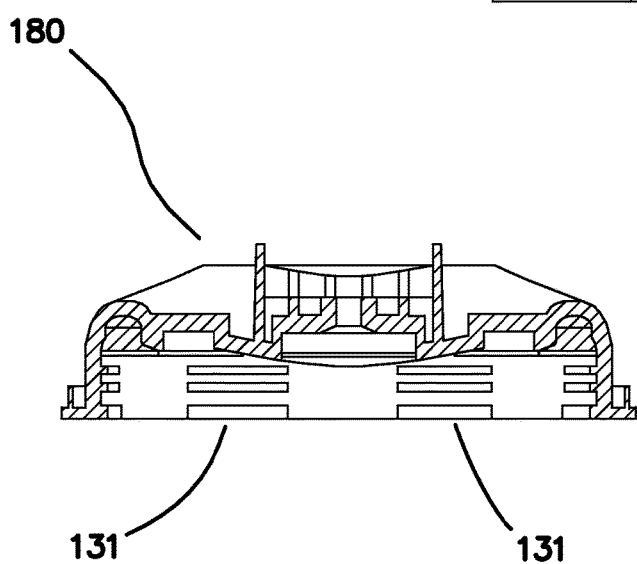

FIGS. 7A-7C illustrate several views, namely a top, side and cross-sectional views, respectively, of the compression cap 180 according to the embodiments of the present invention. The compression cap 180 fits into the lid assembly 110 and retains the leaf spring 190, gasket 200 and pressure cap 210 which operate collectively as set forth above to create a seal and vacuum within the pressure vessel 135.

Figure 8A:
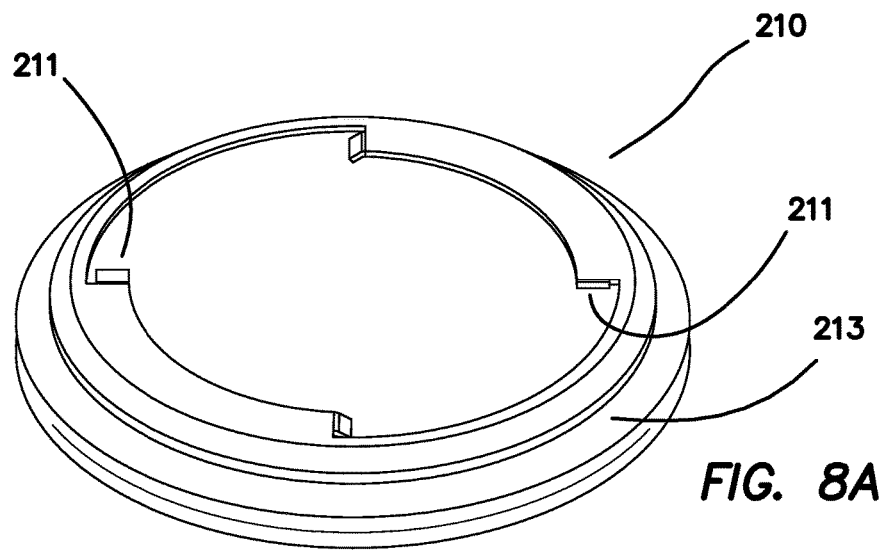
FIGS. 8A-8C illustrate several views of the pressure cap according to the embodiments of the present invention.
Figure 8B:
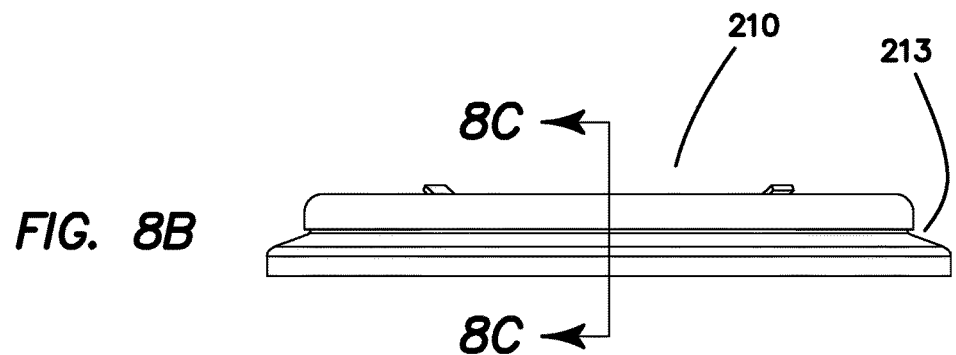
Figure 8C:
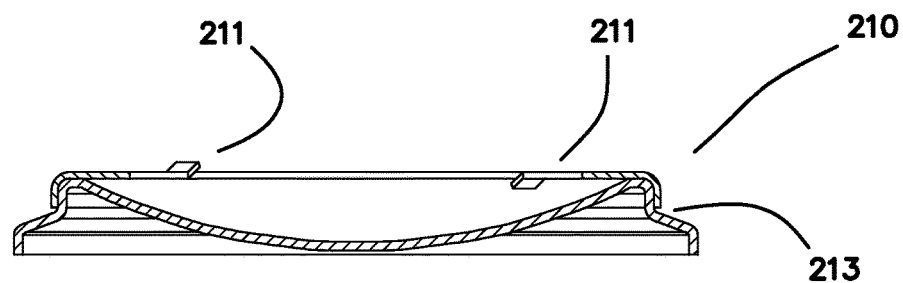
Figure 9A:
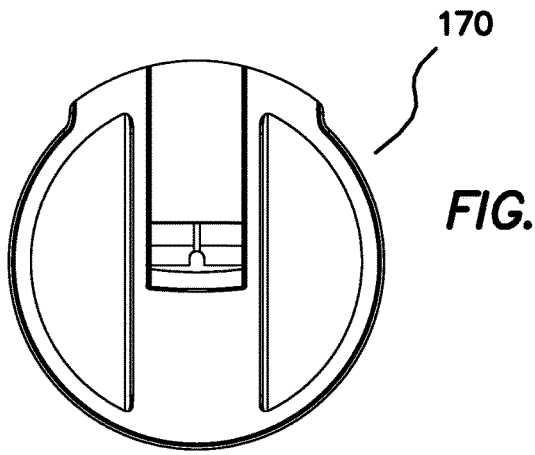
FIGS. 9A-9D illustrate several views of the upper enclosure according to the embodiments of the present invention.
Figure 9B:
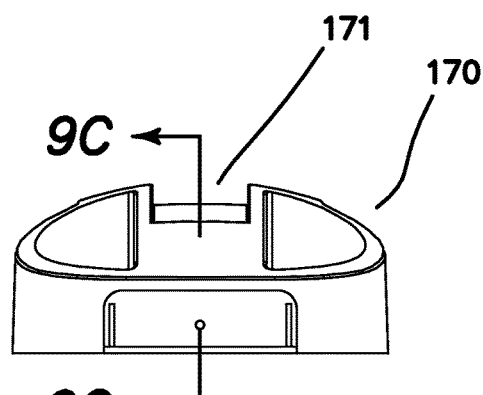
Figure 9C:
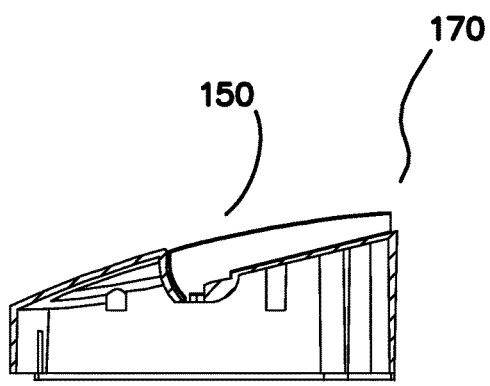
Figure 9D:
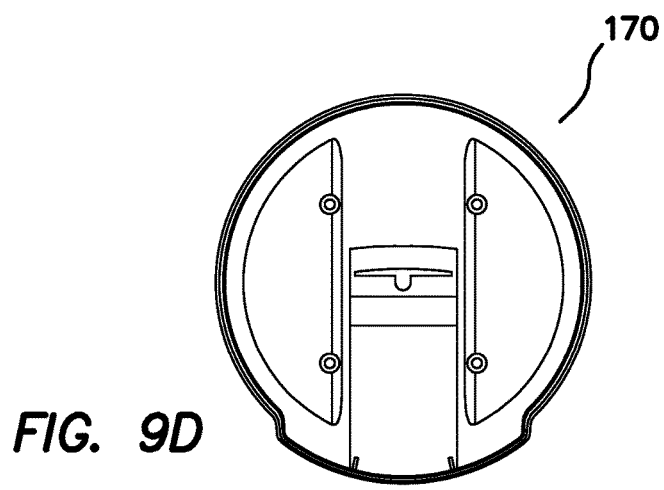
Figure 10A:
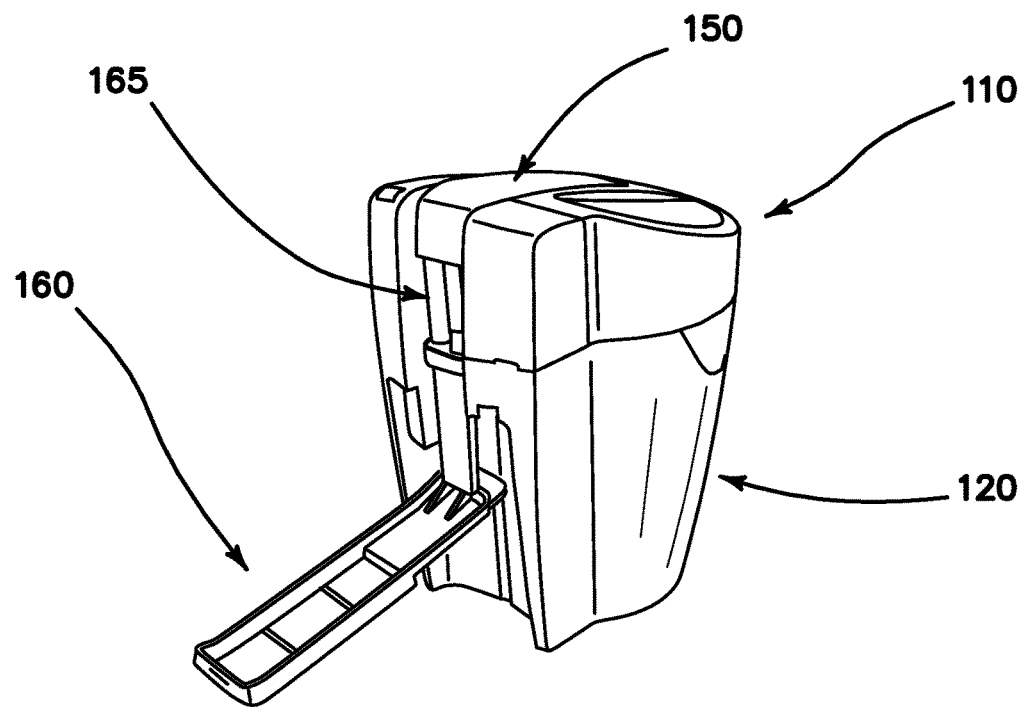
FIGS. 10A-10E illustrate the process by which the lid assembly is removed according to the embodiments of the present invention.
Figure 10B:
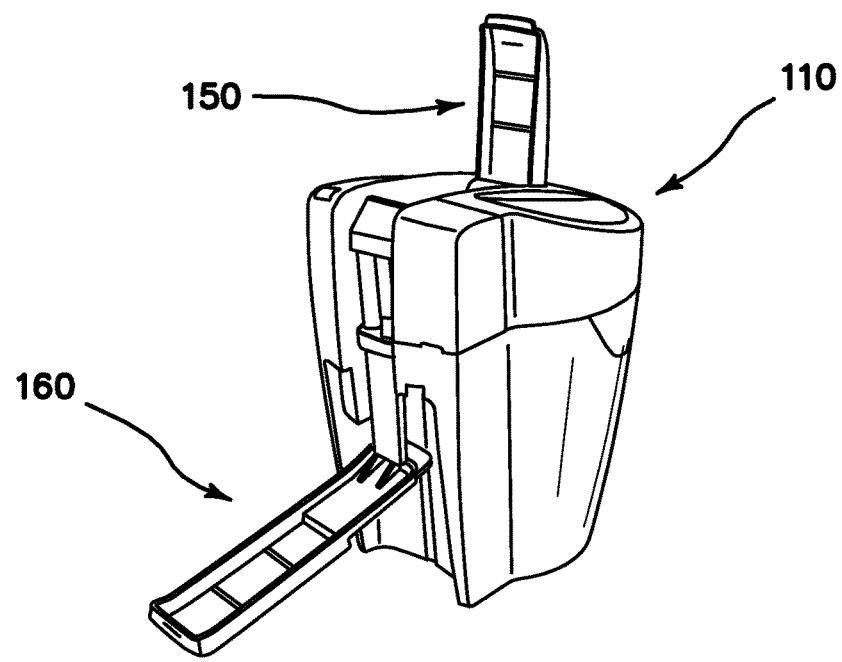
Figure 10C:
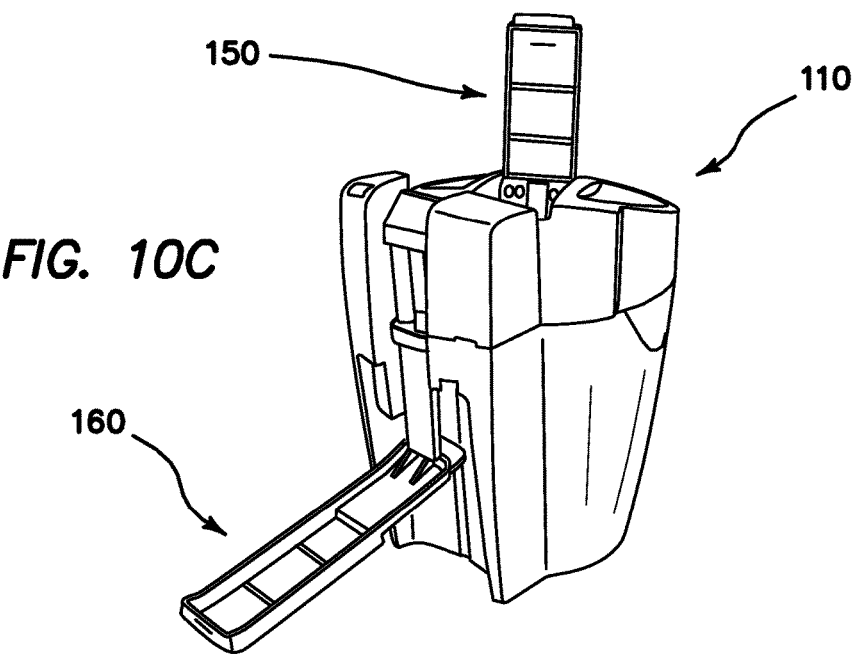
Figure 10D:
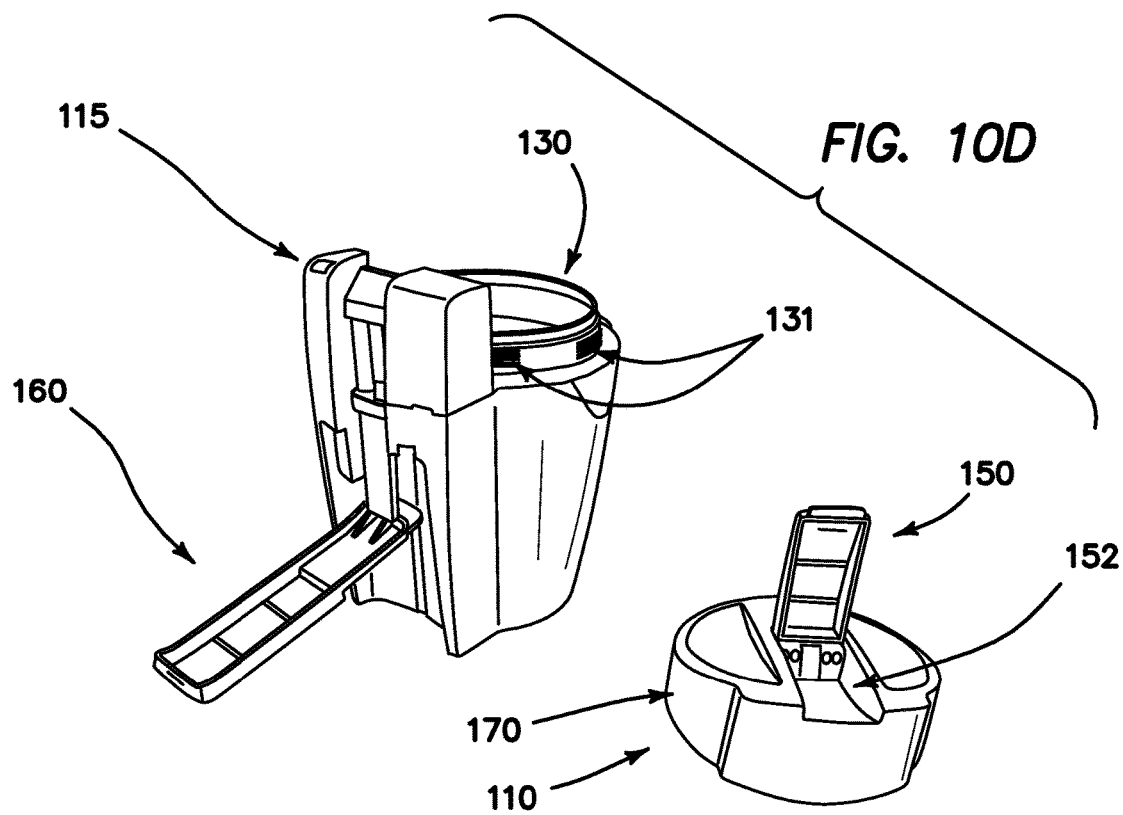
Figure 10E:
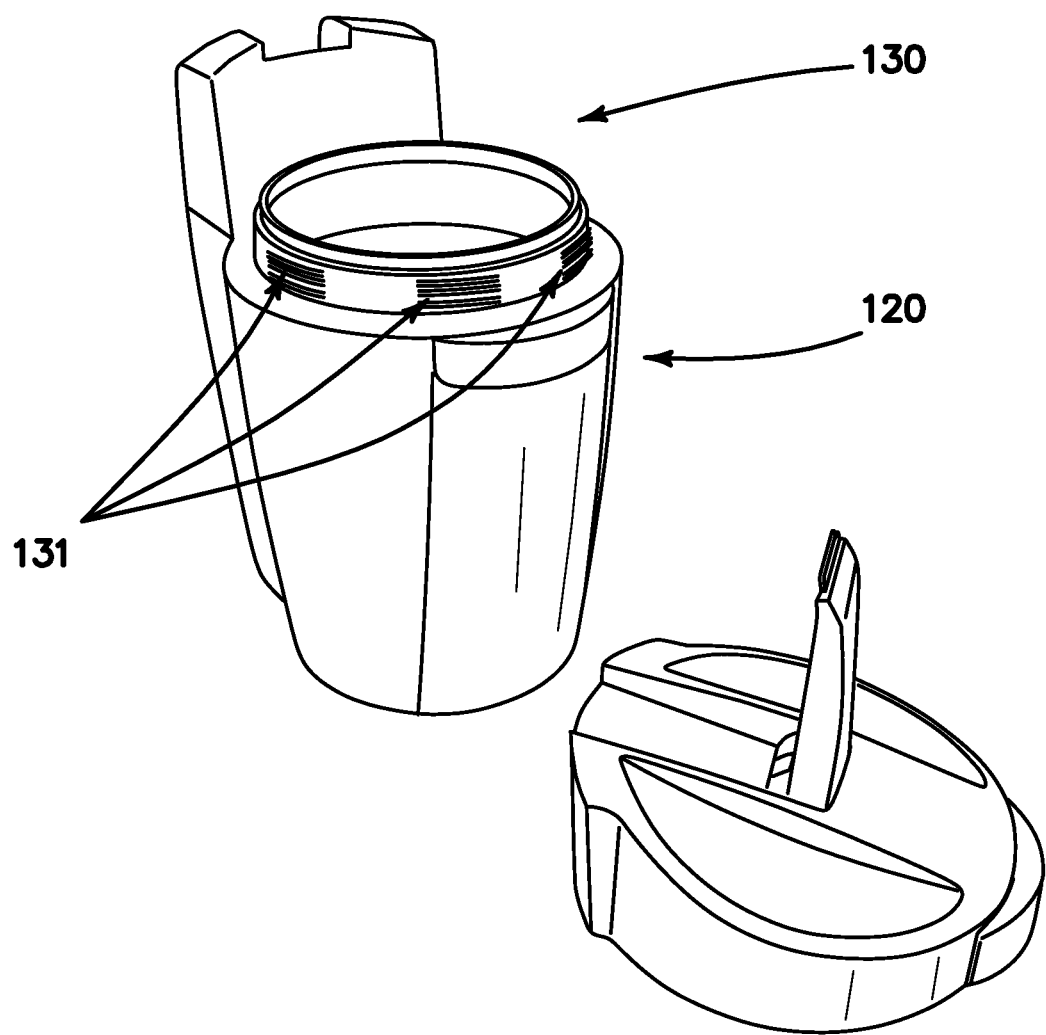

FIGS. 8A-8C illustrate several views, namely perspective, side and cross-sectional views, respectively, of the pressure cap 210 according to the embodiments of the present invention. The pressure cap 210 includes a pair of overhangs 211 for retaining the leaf spring 190 such that the leaf spring 190 is able to move said pressure cap 210 responsive to movements of the rotatable lid lever 150 as described above. An outer lip 213 provides a support for the gasket 200 to rest against.

FIGS. 9A-9D illustrate several views, namely upper, side, bottom and cross-sectional views, of the upper enclosure 170 according to the embodiments of the present invention. The upper enclosure receives the rotatable lid lever 150, compression cap 180, leaf spring 190, gasket 200 and pressure cap 210 which collectively form the lid assembly 110.

The above-described mechanical embodiments described above create a user-friendly water filtration system whereby users are able to easily change the water filter cartridge 300 and align the lid assembly 110 correctly without fail. Additionally, the electronic features of the water filtration system 100 as detailed below further enhance the user experience.

Figure 11:
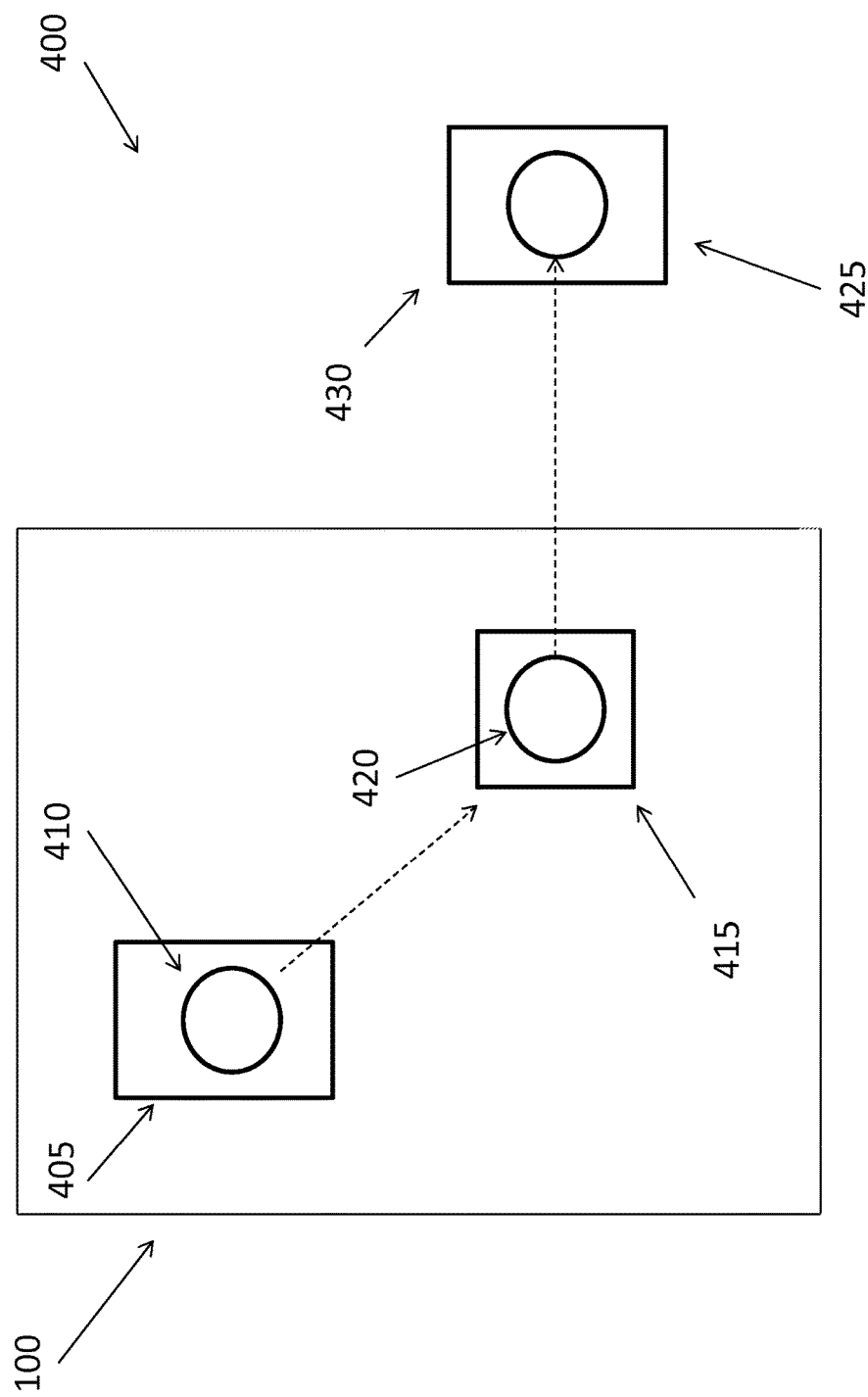
FIG. 11 illustrates a block diagram of an electronic system according to the embodiments of the present invention.

FIG. 11 illustrates a block diagram 400 of an electronic system according to the embodiments of the present invention. An RFID tag 405 associated with each water filter cartridge 410 transmits an identification of a water filter cartridge. A reader (e.g., reading coil) 415 is configured to read the unique identification and either confirm the authenticity of the water filter cartridge identification in local memory and/or central memory via a Wi-Fi transmitter 420 configured to communicate with a Wi-Fi receiver 425 in communication with a centrally maintained server or similar computer hardware and software system. In either instance, the identification of the unique water filter cartridge 410 is compared to a stored water filter cartridge identification and water filtration system identification to authenticate that the correct water filter cartridge 410 in installed in the correct water filtration system. The transmitter 420 may be part of the reader 415 or separate therefrom. In one embodiment, the printed circuit board 145 controls the Wi-Fi transmitter 420 and the information or data it is instructed to transmit to the Wi-Fi receiver 425. Received data is stored in a central server 430 or the like. The Wi-Fi receiver 425 may be part of the server 430 or separate therefrom.

The water filtration system includes means for determining when a water filter cartridge is spent. In one embodiment, a measurement turbine collects data sufficient to determine the status of the water filter cartridge. Other means may include time since installation, water quantity sensors, water quality sensors and the like. Once spent, the water filtration system notifies the user to change the water filter cartridge. In one embodiment, the water filtration system provides an advance notice indication that the water filter cartridge is close to replacement. In one embodiment, once the water filter cartridge is spent or lacks capacity, the water filter system shuts down and/or an alarm sounds intermittingly until a new water filter cartridge is installed. Once installed, the new water filter cartridge is authenticated as detailed herein. In one embodiment, the water filter system is configured to not operate (e.g., shut down or sound alarm intermittingly) unless the water filter cartridge is authenticated as (i) brand name; and/or (ii) lacks capacity.

Figure 12:
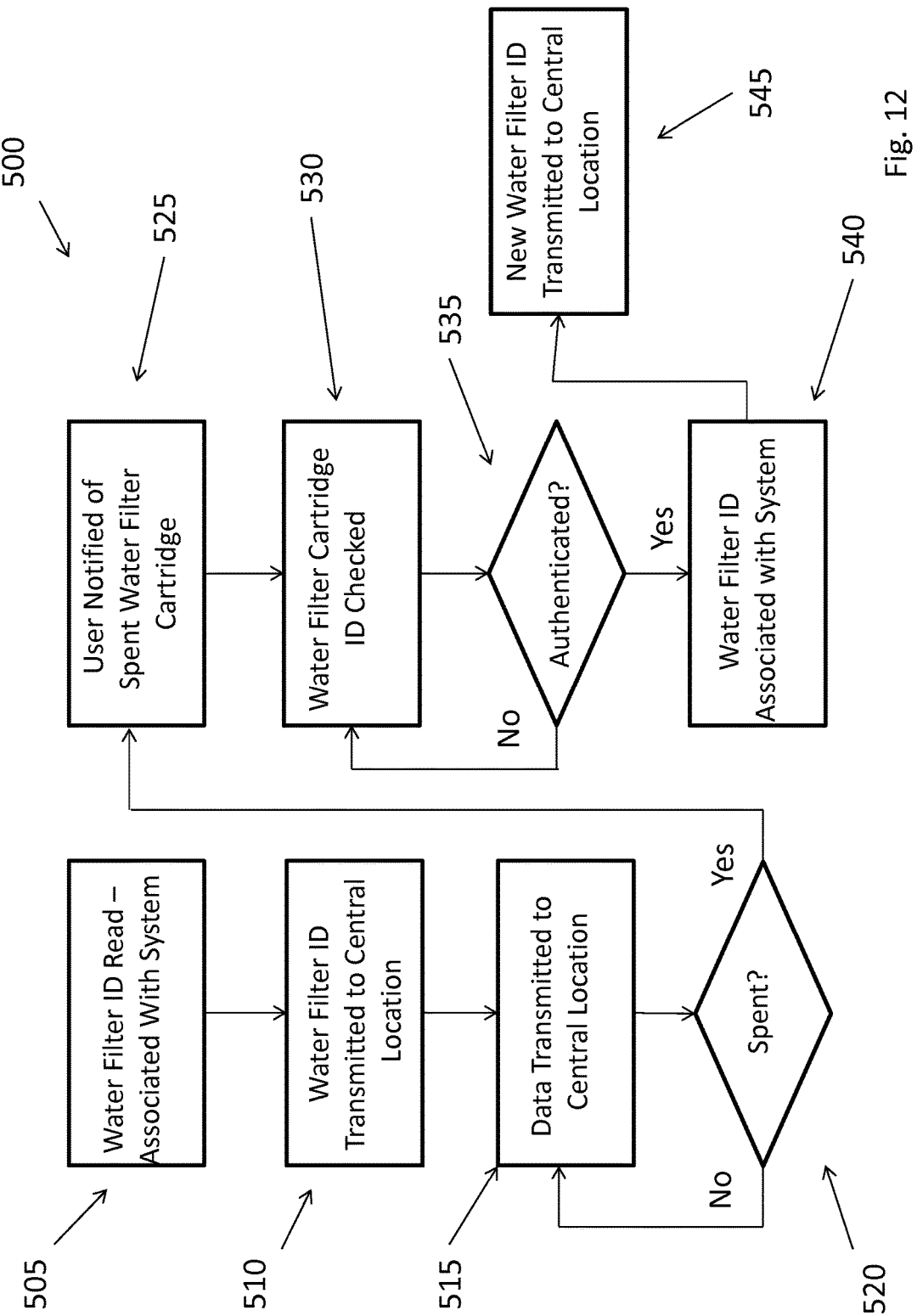
FIG. 12 illustrates a flow chart detailing an authentication process associated with the water filter cartridge according to the embodiments of the present invention.

FIG. 12 shows a flow chart 500 detailing the authentication process associated with the water filter cartridge 410. At 505, an identification associated with the water filter cartridge is read and associated with a particular water filter system. In one embodiment, the RFID tag 405 and reader 415 in the water filtration system associate the water filter cartridge identification with the particular water filtration system. Authentication may require that the format of the RFID tag 405 be of a correct type, as stored locally, at which point the water filter cartridge 410 is deemed authenticated. At 510, the information related to the water filter cartridge identification and particular water filter system is stored locally. The information may also be optionally stored in a central, remote location. At 515, water filtration system data is transmitted to a central location. The data is sent intermittingly to the central location as programmed into the water filtration system. The individual water filtration systems may be polled by the central location as well. At 520, it is determined if the water filter is spent. If so, at 525, the user is so notified via an alarm, activation of a shut-down indicator light, email, text or other communication. At 530, responsive to the spent water filter cartridge being removed and a replacement water filter cartridge being placed into the water filter system, the water filter system checks the identification of the replacement water filter cartridge. At 535, the water filter system seeks to authenticate the replacement water filter cartridge. Authentication may require that a new water filter identification be of the correct type and not match any identification associated with a previously spent water filter cartridge associated with the particular water filtration system as determined locally or any water filtration system as determined centrally. So, in one embodiment, the old water filter cartridge or off brand water filter cartridge will not be authenticated. At 540, the new water filter cartridge identification is associated with the particular water filter system. At 545, the information related to the new water filter cartridge identification and particular water filtration system is optionally transmitted to a central location and stored accordingly.

FIG. 13 illustrates a second flow chart 600 detailing an authentication protocol according to the embodiments of the present invention. At 605, a user is notified of a water filter cartridge issue (e.g., filter spent). At 610, the user replaces the water filter cartridge with a new water filter cartridge and its ID is checked by the system. At 615, it is determined if the new water filter cartridge is authentic. If not, the flow chart 600 loops back to 605. If the new water filter cartridge is authentic, at 620, the new water filter cartridge's ID is stored locally. At 625, the new water filter cartridge's ID is checked with past usage. At 630, the capacity of the new water filter cartridge is checked. If lacking capacity, the flow chart 600 loops back to 605. If sufficient capacity exists, at 635, the new water filter cartridge's ID is registered. At 640, the ID and other data is sent to a central server. At 645, normal use of the water filtration system resumes.

The printed circuit board 145 and Wi-Fi transmitter 420 may be configured to transmit certain performance data to the receiver 425. For example, water usage by hour, day, week, etc., estimated remaining water filter cartridge life, functionality parameters, etc. This data can then be analyzed and used to provide feedback and suggestions to the user including: (i) an estimate of when the water filter cartridge will need to be replaced; (ii) water saving suggestions; and (iii) water usage data. In one embodiment, the user may automatically be sent a new water filter cartridge when the water filter system determines that the current water filter cartridge is near depletion. It is envisioned that in certain embodiments the user can disable the Wi-Fi capabilities.

The printed circuit board 145 includes a processing chip, controller or the like which can be programmed to control the various electronic features of the water filtration system 100. As used herein, the terms "seal" and "vacuum" encompass a substantial seal and substantial vacuum (not just absolute seals and vacuums) necessary to permit the water filtration system 100 or other system utilizing the lid assembly 100 to function properly.

Although the invention has been described in detail with reference to several embodiments, additional variations and modifications exist within the scope and spirit of the invention as described and defined in the following claims.

I claim:

1. A water filtration system comprising:
a housing enclosure containing a pressure vessel configured to receive a water filter cartridge;
inlet and outlet connectors configured to receive source water and dispense filtered water, respectively;
a user interface incorporated within said housing;
an RFID reader configured to read a water filter cartridge identification, said RFID reader integral with said housing and positioned in proximity to said water filter cartridge when said water filter cartridge is installed in said housing;
a processing means;
a wireless communication system for communicating information between the processor and a remote central location; and
an authentication application configured to authenticate a water filter cartridge identification by comparing said water filter cartridge identification with those of other water filter cartridges registered by other water filtration systems at the remote, central location to determine if said inserted water filter cartridge has previously been used by other water filtration systems.

2. The water filtration system of claim 1 wherein said processing means is configured to shut down said water filtration system responsive to a determination by said authentication application that said water filter cartridge has previously been used by other water filtration systems.

3. The water filtration system of claim 1 wherein said processing means is configured to sound an alarm responsive to a determination by said authentication application that said water filter cartridge has previously been used by other water filtration systems.

4. The water filtration system of claim 1 wherein said processing means is configured to activate an indicator light responsive to a determination by said authentication application that said water filter cartridge has previously been used by other water filtration systems.

5. The water filtration system of claim 1 further comprising a transmitter configured to transmit data related to operation of the water filtration system and a receiver configured to receive said data.

6. The water filtration system of claim 5 wherein said transmitter and receiver are Wi-Fi-based.

7. The water filtration system of claim 1,
wherein said read water filter cartridge identification is registered at the remote, central location, and
wherein the authentication application is configured to authenticate said water filter identification by comparing said water filter cartridge identification with those of other water filter cartridges registered at the remote, central location by said water filtration system.

8. The water filtration system of claim 1,
further comprising memory for storing at least one or more water filter identifications,
wherein said read water filter identification is stored locally in said memory, and
wherein the authentication application is configured to authenticate said water filter cartridge identification by comparing said water filter cartridge identification with said one or more water filter cartridge identifications stored in said memory.

9. The water filtration system of claim 1, wherein the authentication application is further configured to determine whether said water filter cartridge is a correct brand.

10. A water filtration system comprising:
a housing enclosure containing a pressure vessel configured to receive a water filter cartridge;
inlet and outlet connectors configured to receive source water and dispense purified water, respectively;
a user interface incorporated within said housing;
memory storing at least one or more water filter identifications;
an RFID reader configured to read a water filter cartridge identification and, if said water filter cartridge has capacity, to register said water filter cartridge identification at a remote, central location;
a wireless communication system configured to transmit data associated with operation of said water filtration system to a remote location for analysis, to receive information related to analysis of said data, and to provide feedback to a customer regarding the same, wherein said feedback includes (i) an estimate of when the water filter cartridge will need to be replaced; (ii) water saving suggestions; and (iii) water usage data.

11. The water filtration system of claim 10 wherein said data associated with operation of said water filtration system includes water usage data, estimated remaining water filter cartridge life and/or functionality parameters.

12. The water filtration system of claim 10 wherein the wireless communication system is Wi-Fi-based.

13. The water filtration system of claim 10, further including an authentication application configured to authenticate a water filter identification, said authentication application configured to determine at least one of the following:
(i) said water filter cartridge is a correct brand; and
(ii) said water filter cartridge is associated with said water filtration system.

14. A water filtration system comprising:
a housing enclosure containing a pressure vessel configured to receive a water filter cartridge;
inlet and outlet connectors configured to receive source water and dispense purified water, respectively;
a user interface incorporated within said housing;
memory storing at least one or more water filter identifications;
an RFID reader configured to read a water filter cartridge identification, said read water filter identification stored locally in said memory and, if said water filter cartridge has capacity, said water filter cartridge being registered at a remote, central location, said RFID reader integral with said housing and positioned in proximity to said water filter cartridge when installed in said housing;
processing means for associating said water filter cartridge identification with said water filtration system;
an authentication application configured to authenticate a water filter identification by comparing RFID tag numbers of authentic water filter cartridges stored in said memory with those of said installed water filter cartridge, said authentication application configured to determine at least one of the following:
(i) said water filter cartridge is a correct brand; and
(ii) said water filter cartridge is associated with said water filtration system; and
a wireless communication system configured to transmit data associated with operation of said water filtration system to a remote location for analysis, to receive information related to analysis of said data, and to provide feedback to a customer regarding the same, wherein said feedback includes (i) an estimate of when the water filter cartridge will need to be replaced; (ii) water saving suggestions; and (iii) water usage data.

15. The water filtration system of claim 14 wherein said processing means is configured to shut down said water filtration system responsive to a determination by said authentication application that said water filter cartridge is not a correct brand and/or is not associated with said water filtration system.

16. The water filtration system of claim 14 wherein said processing means is configured to sound an alarm responsive to a determination by said authentication application that said water filter cartridge is not a correct brand and/or is not associated with said water filtration system.

17. The water filtration system of claim 14 wherein said processing means is configured to activate an indicator light responsive to a determination by said authentication application that said water filter cartridge is not a correct brand and/or is not associated with said water filtration system.

18. The water filtration system of claim 14 further comprising a transmitter configured to transmit data related to operation of the water filtration system and a receiver configured to receive said data.

19. The water filtration system of claim 18 wherein said transmitter and receiver are Wi-Fi-based.

20. The water filtration system of claim 14 wherein said data associated with operation of said water filtration system includes water usage data, estimated remaining water filter cartridge life and/or functionality parameters.

21. The water filtration system of claim 14 wherein the wireless communication system is Wi-Fi-based.

* * * * *